US007606470B2

(12) United States Patent
Shimizu et al.

(10) Patent No.: US 7,606,470 B2
(45) Date of Patent: Oct. 20, 2009

(54) IMAGE PICKUP APPARATUS HAVING MOVING PICTURE PHOTOGRAPHING FUNCTION AND MOVING PICTURE PHOTOGRAPHING METHOD THEREOF

(75) Inventors: Hiroshi Shimizu, Tokyo (JP); Makoto Yokoi, Musashino (JP)

(73) Assignee: Casio Computer Co., Ltd., Tokyo (JP)

( * ) Notice: Subject to any disclaimer, the term of this patent is extended or adjusted under 35 U.S.C. 154(b) by 987 days.

(21) Appl. No.: 10/936,108

(22) Filed: Sep. 8, 2004

(65) Prior Publication Data

US 2005/0057667 A1    Mar. 17, 2005

(30) Foreign Application Priority Data

Sep. 17, 2003  (JP) .............................. 2003-324118

(51) Int. Cl.
*H04N 5/00* (2006.01)
(52) U.S. Cl. ................. 386/117; 348/333.01; 348/390.1
(58) Field of Classification Search ................. 386/117; 348/96, 207, 231–233, 240, 347, 352, 358, 348/390
See application file for complete search history.

(56) References Cited

U.S. PATENT DOCUMENTS

| 5,206,730 | A |   | 4/1993  | Sakai |           |
|-----------|---|---|---------|----------------|-----------|
| 5,293,236 | A |   | 3/1994  | Adachi et al.  |           |
| 5,517,241 | A |   | 5/1996  | Adachi et al.  |           |
| 5,699,113 | A | * | 12/1997 | Ohiwa ........... | 348/240.3 |
| 6,292,217 | B1|   | 9/2001  | Uehara et al.  |           |
| 6,564,329 | B1|   | 5/2003  | Cheung et al.  |           |
| 6,690,881 | B1|   | 2/2004  | Tomita et al.  |           |

| 2001/0038417 | A1 | 11/2001 | Kawamura et al. |
|--------------|----|---------|-----------------|
| 2003/0133504 | A1 | 7/2003  | Matsumura et al.|
| 2003/0142217 | A1 | 7/2003  | Kingetsu et al. |
| 2004/0061789 | A1 | 4/2004  | Uehara et al.   |

FOREIGN PATENT DOCUMENTS

| DE | 40 35 574    | A1 | 5/1991 |
|----|--------------|----|--------|
| EP | 0 982 950    | A2 | 3/2000 |
| GB | 2240446      | A  | 7/1991 |
| JP | 3-154487     | A  | 7/1991 |
| JP | 2000-069428  | A  | 3/2000 |
| JP | 2001-128118  | A  | 5/2001 |

OTHER PUBLICATIONS

An Extended European Search Report dated Apr. 1, 2008, issued in a counterpart European Application.
JVC: "Digital Video Camera GR-DVL 867, 865, 767, 765, 567, 367, 365, 167, 160 Instructions", Feb. 9, 2002, JVC, XP002311271, p. 16.

* cited by examiner

*Primary Examiner*—Thai Tran
*Assistant Examiner*—Mishawn Dunn
(74) *Attorney, Agent, or Firm*—Frishauf, Holtz, Goodman & Chick, P.C.

(57) ABSTRACT

An image pickup apparatus operating in a moving picture photographing mode, wherein, before a start of moving picture photographing is indicated by a shutter button on a key input section, a clock frequency of a control section is made to be a normal frequency so that electricity consumption is reduced in a monitoring state to lengthen the life of a battery, and wherein, when the start of moving picture photographing is indicated, the clock frequency is increased to a large extent by a clock switching control section, so that an MPEG converter can access at a high speed an SDRAM storing YUV data such as reference data, search data, or the like at the time of encoding processing of moving picture data, and the moving picture compression can be achieved in real-time.

30 Claims, 4 Drawing Sheets

IMAGE PICKUP APPARATUS HAVING MOVING PICTURE PHOTOGRAPHING FUNCTION AND MOVING PICTURE PHOTOGRAPHING METHOD THEREOF

CROSS-REFERENCE TO RELATED APPLICATIONS

This application is based upon and claims the benefit of priority from prior Japanese Patent Application No. 2003-324118, filed Sep. 17, 2003, the entire contents of which are incorporated herein by reference.

BACKGROUND OF THE INVENTION

1. Field of the Invention

The present invention relates to an image pickup apparatus which can be used for, for example, a digital camera having a moving picture photographing function, and a moving picture photographing method thereof.

2. Description of the Related Art

Conventionally, as a recording system of moving picture having large information content, there is a system in accordance with MPEG (Motion Picture Experts Group) standard. In the MPEG system, an inter-frame predictive coding technique in which high encoding efficiency can be obtained in compression/extension of moving picture formed from a plurality of frames is used. Generally, in encoding processing of the MPEG system, because YUV data such as reference data, search data, or the like are stored in a memory such as an SDRAM or the like, and an MPEG encoder frequently accesses to the memory and repeats reading and writing the above-described data, extremely large memory transferring amounts are generated in the process.

On the other hand, there are many types of portable telephone with a camera and digital still camera (hereinafter, simply called a digital camera) which have a moving picture photographing function in addition to a normal still image photographing function. In recent years, there has been a trend in which the MPEG system is used for recording moving picture therein.

BRIEF SUMMARY OF THE INVENTION

According to an aspect of the present invention, there is provided an image pickup apparatus comprising:

an image pickup section which can carry out moving picture photographing;

a moving picture compressing section which compresses moving picture data obtained by moving picture photographing processing by the image pickup section using a working memory;

a recording control section which records the moving picture data compressed by the moving picture compressing section onto a recording medium;

a start indicating section which indicates a start of moving picture recording;

a processing control section which starts compression processing by the moving picture compressing section and recording processing by the recording control section when a start of moving picture recording is indicated by the start indicating section; and a switching control section which switches a read/write speed of data in the working memory from a low speed to a high speed when a start of moving picture recording is indicated by the start indicating section.

According to another aspect, there is provided an image pickup apparatus comprising:

an image pickup section which can carry out moving picture photographing;

a moving picture compressing section which compresses moving picture data obtained by moving picture photographing processing by the image pickup section using a working memory;

a recording control section which records the moving picture data compressed by the moving picture compressing section onto a recording medium;

a transition indicating section which indicates a transition to a stand-by state of moving picture recording;

a start indicating section which indicates a start of moving picture recording;

a switching control section which switches a read/write speed of data in the working memory from a low speed to a high speed when a transition to a stand-by state of moving picture recording is indicated by the transition indicating section; and a processing control section which starts compression processing by the moving picture compressing section and recording processing by the recording control section when a start of moving picture recording is indicated by the start indicating section.

According to another aspect, there is provided an image pickup apparatus comprising:

image pickup means for being able to photograph moving picture;

moving picture compressing means for compressing moving picture data obtained by moving picture photographing processing by the image pickup means using a working memory;

recording control means for recording the moving picture data compressed by the moving picture compressing means onto a recording medium;

start indicating means for indicating a start of moving picture recording;

processing control means for starting compression processing by the moving picture compressing means and recording processing by the recording control means when a start of moving picture recording is indicated by the start indicating means; and switching control means for switching a read/write speed of data in the working memory from a low speed to a high speed when a start of moving picture recording is indicated by the start indicating means.

Further, according to another aspect, there is provided an image pickup apparatus comprising:

an image pickup means which can carry out moving picture photographing;

a moving picture compressing means which compresses moving picture data obtained by moving picture photographing processing by the image pickup means using a working memory;

a recording control means which records the moving picture data compressed by the moving picture compressing means onto a recording medium;

a transition indicating means which indicates a transition to a stand-by state of moving picture recording;

a start indicating means which indicates a start of moving picture recording;

a switching control means which switches a read/write speed of data in the working memory from a low speed to a high speed when a transition to a stand-by state of moving picture recording is indicated by the transition indicating means; and a processing control means which starts compression processing by the moving picture compressing means and recording processing by the recording control means when a start of moving picture recording is indicated by the start indicating means.

Further, according to another aspect, there is provided a moving picture photographing method of an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, the moving picture photographing method comprising:

indicating a start of moving picture recording;

switching a read/write speed of data in the working memory from a low speed to a high speed when a start of moving picture recording is indicated; and starting compression processing by the moving picture compressing section and recording processing by the recording control section after the read/write speed of data in the working memory is switched from the low speed to the high speed.

Further, according to another aspect, there is provided a moving picture photographing method of an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, the moving picture photographing method comprising:

indicating a transition to a stand-by state of moving picture recording;

switching a read/write speed of data in the working memory from a low speed to a high speed when a transition to a stand-by state of moving picture recording is indicated;

indicating a start of moving picture recording; and starting compression processing by the moving picture compressing section and recording processing by the recording control section when a start of moving picture recording is indicated.

Further, according to another aspect, there is provided a moving picture photographing program for causing a computer, which is provided in an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, to execute:

a process of indicating a start of moving picture recording;

a process of switching a read/write speed of data in the working memory from a low speed to a high speed when a start of moving picture recording is indicated; and a process of starting compression processing by the moving picture compressing section and recording processing by the recording control section after the read/write speed of data in the working memory is switched from the low speed to the high speed.

Further, according to another aspect, there is provided a moving picture photographing program for causing a computer, which is provided in an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, to execute:

a process of indicating a transition to a stand-by state of moving picture recording;

a process of switching a read/write speed of data in the working memory from a low speed to a high speed when a transition to a stand-by state of moving picture recording is indicated;

a process of indicating a start of moving picture recording; and a process of starting compression processing by the moving picture compressing section and recording processing by the recording control section when a start of moving picture recording is indicated.

DETAILED DESCRIPTION OF THE INVENTION

Hereinafter, embodiments of the present invention will be described with reference to the drawings.

First Embodiment

Figure 1:
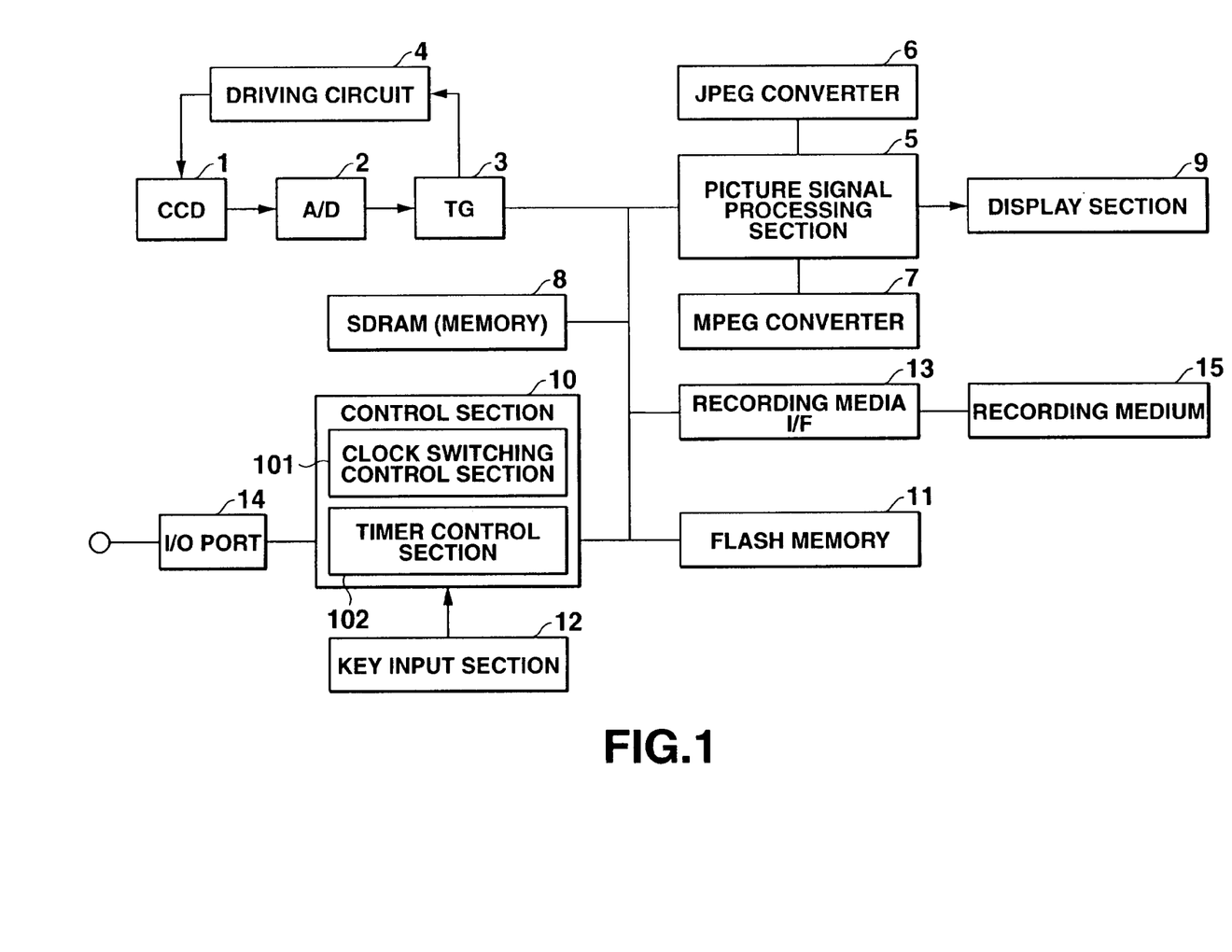
FIG. 1 is a block diagram showing an electrical configuration of a digital camera common to respective embodiments of the present invention.

FIG. 1 is a block diagram showing an electrical configuration of a digital camera common to respective embodiments of the invention. This digital camera has a moving picture photographing function in addition to a normal still image photographing function, and has a CCD 1, an A/D converter 2, a timing generator (TG) 3, a driving circuit 4, an image signal processing section 5, a JPEG converter 6, an MPEG converter 7, an SDRAM 8, and a display section 9.

Due to the CCD 1 being driven by the driving circuit 4 on the basis of a timing signal transmitted from the timing generator 3, the CCD 1 photo-electrically converts an optical image of an object which has been incident via an optical system (not shown), and outputs analog image pickup signals of one screen at given intervals. The A/D converter 2 converts the analog image pickup signals outputted by the CCD 1 into digital image signals. The converted image pickup signals are transmitted to the image signal processing section 5 via the timing generator 3.

In a photographing stand-by state in a still image photographing mode and a moving picture photographing mode, the image signal processing section 5 generates a digital image signal for each of R, G, and B from an image pickup signal which has been outputted from the CCD 1 and converted into a digital signal, and applies various picture processing such as pixel interpolation processing, white-balance processing, luminance/chromatic-difference signal conversion processing, or the like to the image signal, and generates a video signal on the basis of the processed image data and transmits the video signal to the display section 9.

The display section 9 includes a liquid-crystal display on which color display is possible and a driving circuit thereof, and displays an image based on the above-described video signal which is transmitted from the image signal processing section 5 and is sequentially varied, i.e., a through image. Further, the display section 9 carries out, as is for an operational assistance, a display of processing menu at the time of selecting functions and a display of diagrams, icons or the like for setting.

The JPEG converter 6 is formed from a circuit dedicated to carrying out compression and expansion of still image data in accordance with a JPEG (Joint Photographic Experts Group) standard, and at the time of photographing in a still image photographing mode, the JPEG converter 6 compresses image data onto which image processing is applied by the image signal processing section 5. Here, the compressed data is transferred to a flash memory 11 or a recording media interface circuit 13 which will be described later. Further, in a reproduction mode, the JPEG converter 6 expands still image data which has been recorded in a state of being compressed. Here, the expanded still image data is displayed as a still image on the display section 9 by being transmitted to the image signal processing section 5 and converted into a video signal.

The MPEG converter 7 is formed from a circuit dedicated to carrying out compression and expansion of moving picture data in accordance with the MPEG standard, and at the time of photographing in a moving picture photographing mode, the MPEG converter 7 successively compresses moving picture data onto which picture processing are applied by the image signal processing section 5, i.e., the image data for each frame which has been sequentially picked-up by the CCD 1. Here, the compressed data is transferred to the flash memory 11 or the recording media interface circuit 13 which will be described later. Further, in a reproduction mode, the MPEG converter 7 expands moving picture data which has been recorded in the compressed state. Here, the expanded moving picture data are successively transmitted to the image signal processing section 5 and converted into video signals, and thereafter, are displayed as a moving picture on the display section 9.

The SDRAM 8 is a working memory in the embodiments, and YUV data such as reference data, search data, or the like, i.e., image data is temporarily stored therein at the time of compression and expansion of moving picture data by the MPEG converter 7. Further, image data generated in the process at the time of compressing and expanding a still image by the JPEG converter 6 is temporarily stored in the SDRAM 8.

Further, the digital camera has a control section 10, the flash memory 11, a key input section 12, the recording media interface circuit 13, and an I/O port 14.

The control section 10 is composed of peripheral circuits including a processor (CPU) and a program ROM and RAM which are not illustrated, and a clock switching control section 101 and a timer control section 102 which are illustrated. In the control section 10, the above-described processor functions as control means of the embodiments by controlling the above-described respective sections of the digital camera on the basis of various control programs stored in the program ROM and key operation signals transmitted from the key input section 12.

Further, the clock switching control section 101 is switching means of the embodiments, and receives a clock switching signal from the above-described processor, and switches an access speed (a read or write speed of data) of the aforementioned SDRAM 8 by switching the clock signal frequency. The timer control section 102 starts various time-counting operations by receiving a count start signal from the above-described processor, and outputs an ending signal to the processor at a point in time when the time-counting operations are completed.

The flash memory 11 is a nonvolatile memory storing the data required to be maintained even when the power source is turned off as well, for example, various setting data set by a user. Note that some or all of the control programs stored in the program ROM of the control section 10 described above may be recorded in the flash memory 11.

The key input section 12 has a shutter button, a power source on/off key, a mode switching key used for switching an operation mode, a cursor key used for selecting a function and selecting a screen, a set key, or the like, and outputs an operation signal corresponding to the key operation to the control section 10. The above-described mode switching key is used for switching a still image photographing mode and a moving picture photographing mode, and a reproduction mode for reproducing a still image or a moving picture. Further, the above-described shutter button has a configuration in which it is possible to operate at two-stages of a half-pressed state for indicating AF locking in a still image photographing mode and a moving picture photographing mode, and a fully-pressed state for indicating photographing, and functions as indicating means of the embodiments in a moving picture photographing mode.

Various recoding media 15 mounted on a camera body (not shown) are connected to the aforementioned recording media interface circuit 13. When the shutter button is operated so as to be fully pressed in a still image photographing mode, the recording media interface circuit 13 records the compressed still image data which has been transferred from the aforementioned JPEG converter 6 onto the recording medium 15, and when the shutter button is operated so as to be fully pressed in a moving picture photographing mode, the recording media interface circuit 13 records the compressed moving picture data which are successively transferred from the MPEG converter 7 onto the recording medium 15. Note that, for example, when the recording medium 15 is not mounted thereon, the compressed still image data or moving picture data is recorded on an image recording area which has been ensured in advance in the flash memory 11.

The I/O port 14 is used for inputting/outputting various data including image data between the digital camera and an external device, for example, for transferring the still image data or the moving picture data which has been already recorded onto the recording medium 15.

Figure 2:
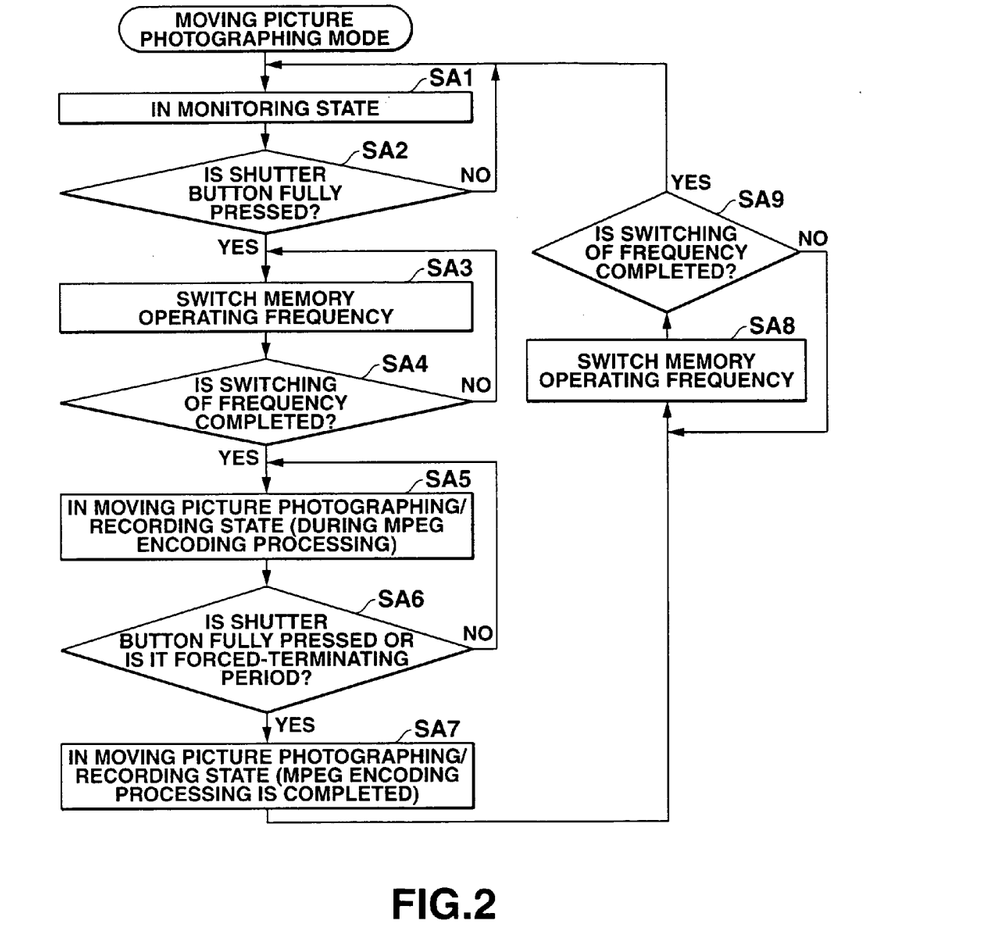
FIG. 2 is a flowchart showing operations in a moving picture photographing mode in a first embodiment.

Next, operations in accordance with the control of the control section 10 when a moving picture photographing mode is selected by a user in the digital camera formed from the above-described configuration will be described in accordance with a flowchart of FIG. 2.

When a moving picture photographing mode is selected, the digital camera is made to be in a monitoring state, i.e., a photographing stand-by state, and starts to drive the CCD 1, and continues the processing of displaying a picked-up through image of an object on the display section 9 (step SA1). In this state, when the shutter button is fully pressed by the user (YES at step SA2), a clock signal is switched to a clock signal having a frequency higher than a normal frequency by the clock switching control section 101, and in accordance therewith, an access speed of the SDRAM 8 is made to be a high speed (step SA3). Thereafter, the time when the operation of switching the frequency is completed is waited for, and at the point in time when it is completed (YES at step SA4), the digital camera proceeds to a moving picture photographing/recording state, and starts MPEG encoding processing in which image data of each frame which has been sequentially picked-up by the CCD 1 is successively compressed by the MPEG converter 7 and the SDRAM 8, and records moving picture data onto the recording medium 15 by continuing the processing (step SA5).

Then, when the shutter button is fully pressed again by the user, or when a photographing-forced-terminating period has come in which the storage capacity of the recording medium 15 reaches the upper limit, or it has reached a maximum moving picture photographing time determined in advance (YES at step SA6), the moving picture photographing is completed at that point in time, and the MPEG encoding processing by the MPEG converter 7 and the SDRAM 8 is completed (step SA7). Continuously, the clock signal is switched to a clock signal having a normal frequency by the clock switching control section 101, and the access speed of the SDRAM 8 is made to return to a normal speed (low speed) (step SA8). Thereafter, the time when the operation of switching the frequency is completed is waited for, and at the point in time when it is completed (YES at step SA9), the digital camera proceeds to a monitoring state again (step SA1), and the above-described operations are repeated.

Note that, in the present embodiment, the access speed of the SDRAM 8 is switched from a normal speed to a high speed at the time of starting moving picture photographing at the point in time when the fully-pressed state of the shutter button for the first time is carried out, and is made to return to the normal speed at the time of ending the moving picture photographing started by the fully-pressing operation of the shutter button for the second time. However, it may be carried out as follows.

For example, the access speed of the SDRAM 8 may be switched from a normal speed to a high speed at the point in time when a moving picture photographing mode is set by the user, and may be made to return to the normal speed at the point in time when a moving picture photographing mode is completed (is switched to another operating mode) by the user. Further, additionally, the access speed of the SDRAM 8 may be switched from a normal speed to a high speed at the point in time when the fully-pressing operation of the shutter button for the first time is carried out after a moving picture photographing mode is set, and the access speed may be made to return to the normal speed at the point in time when a moving picture photographing mode is completed by the user.

Second Embodiment

Next, a second embodiment of the present invention will be described. The present embodiment has the configuration shown in FIG. 1, and relates to a digital camera in which a control program for causing the shutter button on the aforementioned key input section 12 to function as first indicating means and second indicating means is stored in the program ROM of the control section 10.

Figure 3:
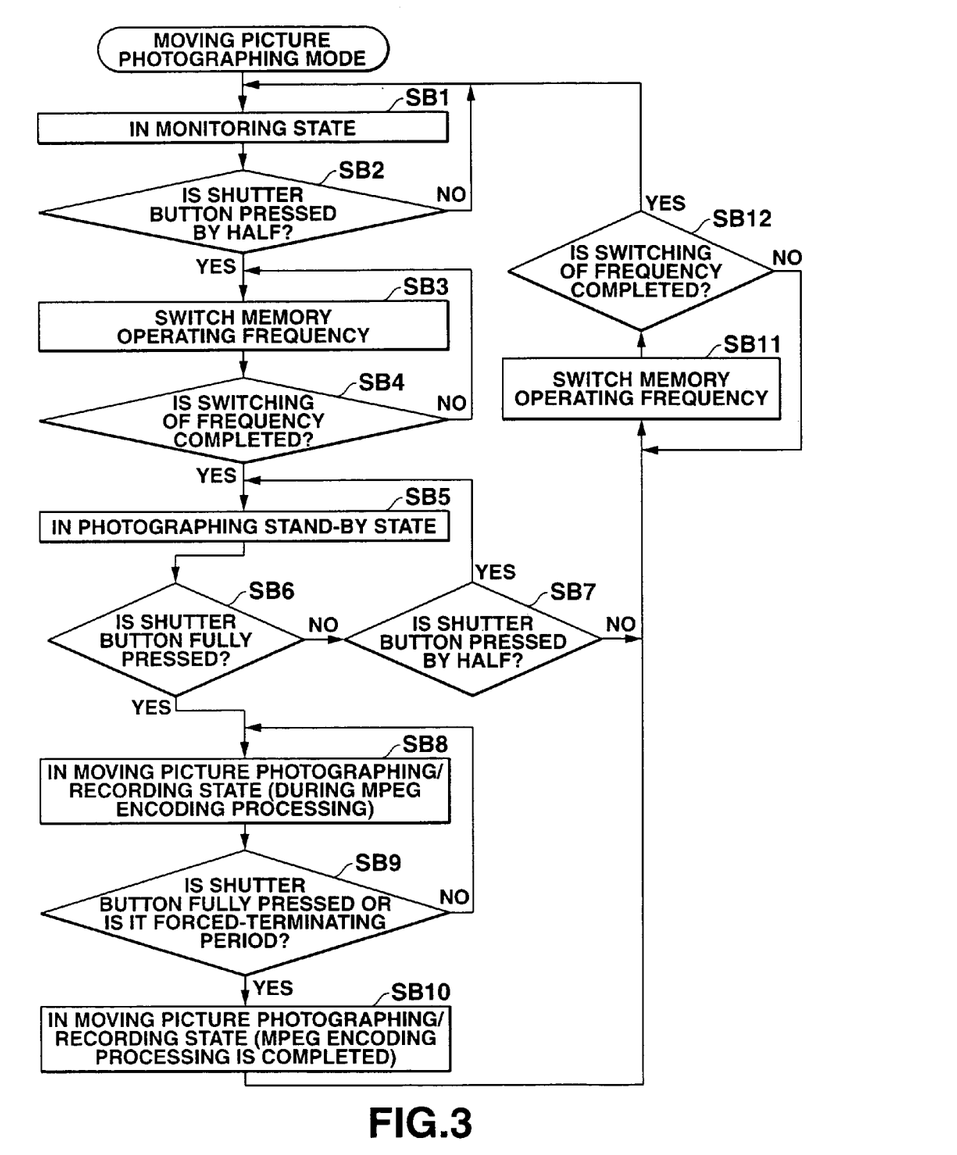
FIG. 3 is a flowchart showing operations in a moving picture photographing mode in a second embodiment.

FIG. 3 is a flowchart showing operations in accordance with the control of the control section 10 when a moving picture photographing mode is selected by the user in the digital camera of the present embodiment.

In the present embodiment, when a moving picture photographing mode is selected, the digital camera is immediately made to be in a monitoring state (a photographing stand-by state) (step SB1). In this state, when the shutter button is pressed by half by the user (YES at step SB2), a clock signal is switched to a clock signal having a frequency higher than a normal frequency by the clock switching control section 101, and in accordance therewith, an access speed of the SDRAM 8 is made to be a high speed (step SB3), and at the point in time when it is completed (YES at step SB4), the digital camera once proceeds to a photographing stand-by state (step SB5). Note that the content of the operation in this state is the same as in the monitoring state at step SB1.

Continuously, when the shutter button in the half-pressed state is fully pressed by the user during the time of being in this photographing stand-by state (YES at step SB6), the digital camera proceeds to a moving picture photographing/recording state, and starts MPEG encoding processing by the MPEG converter 7 and the SDRAM 8, and records moving picture data onto the recording medium 15 by continuing the processing (step SB8).

Then, when the shutter button is fully pressed again by the user, or when the photographing-forced-terminating period described above has come (YES at step SB9), at that point in time, the moving picture photographing (MPEG encoding processing) is completed (step SB10). Thereafter, a clock signal is switched to a clock signal having a normal frequency, and the access speed of the SDRAM 8 is made to return to a normal speed (low speed) (step SB11), and at the point in time when it is completed (YES at step SB12), the digital camera proceeds to a monitoring state again (step SB1), and the above-described operations are repeated.

On the other hand, when the shutter button in the half-pressed state is cancelled without being fully pressed by the user after the digital camera has been made to be in a photographing stand-by state at step SB5, (NO at both steps SB6, SB7), the digital camera immediately proceeds to step SB11 described above without executing moving picture photographing, and the access speed of the SDRAM 8 is made to return to a normal speed (low speed), and at the point in time when it is completed (YES at step SB12), the digital camera proceeds to a monitoring state again (step SB1), and the above-described operations are repeated.

Third Embodiment

Next, a third embodiment of the present invention will be described. The present embodiment relates to a digital camera in which, although a state of a half-pressing operation is not provided to the shutter button on the aforementioned key input section 12 in the configuration shown in FIG. 1, a control program for causing the shutter button to function as first indicating means and second indicating means of the invention is stored in the program ROM of the control section 10.

Figure 4:
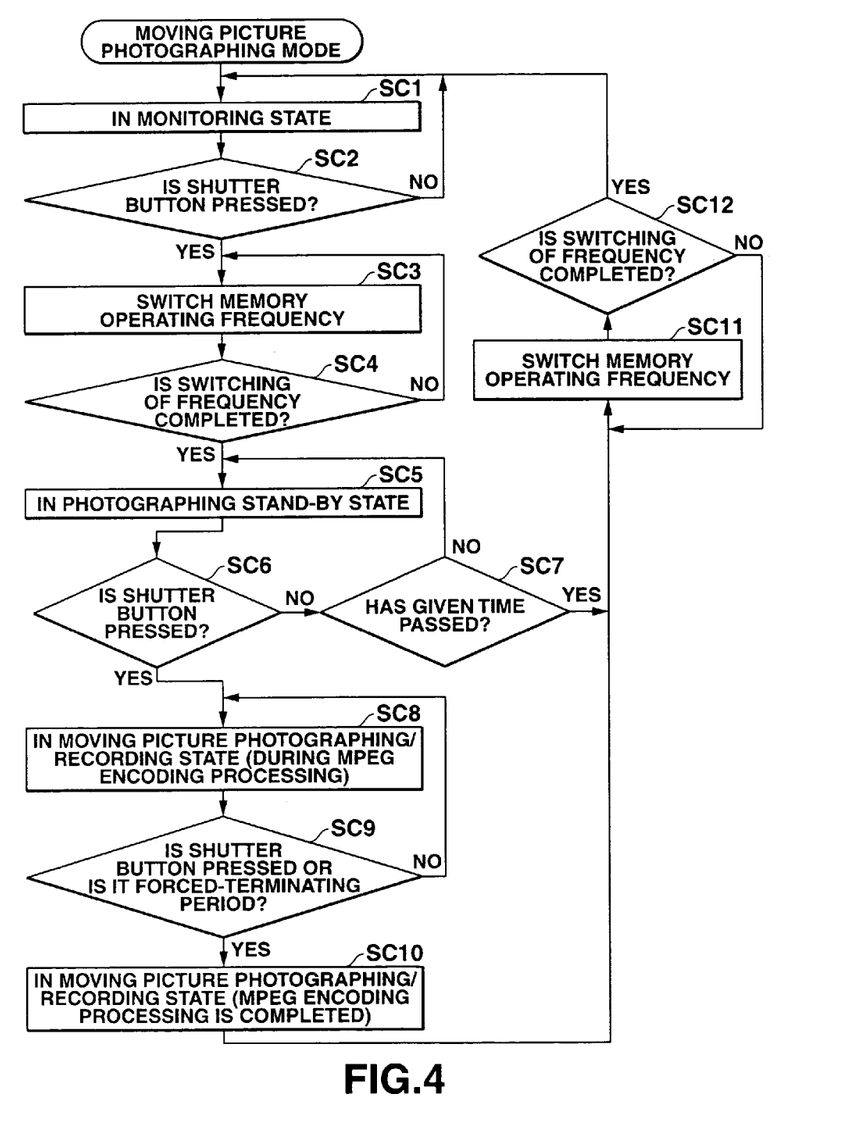
FIG. 4 is a flowchart showing operations in a moving picture photographing mode in a third embodiment.

FIG. 4 is a flowchart showing operations in accordance with the control of the control section 10 when a moving picture photographing mode is selected by the user in the digital camera of the present embodiment.

Namely, in the present embodiment, after the digital camera is made to be in a monitoring state by selecting a moving picture photographing mode (step SC1), when the shutter button is pressed (YES at step SC2), an access speed of the SDRAM 8 is made to be a high speed due to a clock signal being switched to a clock signal having a frequency higher than a normal frequency (step SC3), and at the point in time when it is completed (YES at step SC4), and the digital camera once proceeds to a photographing stand-by state (step SC5).

Then, when a second operation of the shutter button is carried out in the photographing stand-by state (YES at step SC6), the digital camera proceeds to a moving picture photographing/recording state, and starts to record moving picture data onto the recording medium 15 (step SC8). Then, when an operation of the shutter button for the third time is carried out by the user, or when a photographing-forced-terminating period described above has come (YES at step SC9), the moving picture photographing (MPEG encoding processing) is completed at that point in time (step SC10). Thereafter, a clock signal is switched to a clock signal having a normal frequency, and the access speed of the SDRAM 8 is made to return to a normal speed (low speed) (step SC11), and at the point in time when it is completed (YES at step SC12), the digital camera proceeds to a monitoring state again (step SC1), and the above-described operations are repeated.

On the other hand, after the digital camera is made to be in a photographing stand-by state at step SC5, when a given time has passed from the time when the digital camera is made to be in a photographing stand-by state without the shutter button being pressed by the user (NO at step SC6 and YES at step SC7), the digital camera immediately proceeds to step SC11 described above without executing moving picture photographing, and the access speed of the SDRAM 8 is made to return to a normal speed (low speed), and at the point in time when it is completed (YES at step SC12), the digital camera proceeds to a monitoring state again (step SC1), and the above-described operations are repeated.

Further, in the first to third embodiments described above, the moving picture photographing processing may be made to be different in a monitoring state (photographing stand-by state) and in a moving picture photographing/recording state. For example, a frame rate may be changed, or an image size (resolution) may be changed.

Further, in the first to third embodiments described above, the case in which the invention is used for a digital camera was described. However, the invention is not limited thereto, the invention can be used for cameras which are built-in into a portable telephone and other portable information terminals.

What is claimed is:

1. An image pickup apparatus comprising:
    an image pickup section which can carry out moving picture photographing;
    a moving picture compressing section which compresses moving picture data obtained by moving picture photographing processing by the image pickup section using a working memory;
    a recording control section which records the moving picture data compressed by the moving picture compressing section onto a recording medium;
    a start indicating section which indicates a start of moving picture recording;
    a processing control section which starts compression processing by the moving picture compressing section and recording processing by the recording control section when the start of moving picture recording is indicated by the start indicating section;
    a switching control section which switches a read or write speed of data in the working memory from a low speed to a high speed when the start of moving picture recording is indicated by the start indicating section;
    a display section which displays a through image; and
    a display control section which displays on the display section the moving picture data obtained by the moving picture photographing processing by the image pickup section as the through image when the read or write speed of data in the working memory is set to the low speed;
    wherein the start indicating section indicates the start of moving picture recording while the through image is displayed on the display section by the display control section.

2. The image pickup apparatus according to claim 1, wherein the processing control section further starts moving picture photographing processing by the image pickup section when the start of moving picture recording is indicated by the start indicating section.

3. The image pickup apparatus according to claim 1, wherein the start indicating section indicates the start of moving picture recording in response to a predetermined key operation.

4. The image pickup apparatus according to claim 1, further comprising an end indicating section which indicates an end of moving picture recording,
    wherein the processing control section ends the compression processing by the moving picture compressing section and the recording processing by the recording control section when the end of moving picture recording is indicated by the end indicating section, and
    wherein the switching control section switches the read or write speed of data in the working memory from the high speed to the low speed when the end of moving picture recording is indicated by the end indicating section.

5. The image pickup apparatus according to claim 4, wherein the end indicating section indicates the end of moving picture recording in response to a predetermined key operation.

6. The image pickup apparatus according to claim 4, wherein the end indicating section indicates the end of moving picture recording in response to passing of a predetermined time after the start of moving picture recording is indicated by the start indicating section.

7. The image pickup apparatus according to claim 1, wherein the moving picture compressing section compresses the moving picture data by compression processing including inter-frame predictive coding.

8. The image pickup apparatus according to claim 7, wherein the moving picture compressing section compresses the moving picture data by compression processing in accordance with an MPEG system.

9. An image pickup apparatus comprising:
    an image pickup section which can carry out moving picture photographing;
    a moving picture compressing section which compresses moving picture data obtained by moving picture photographing processing by the image pickup section using a working memory;
    a recording control section which records the moving picture data compressed by the moving picture compressing section onto a recording medium;
    a transition indicating section which indicates a transition to a stand-by state of moving picture recording;
    a start indicating section which indicates a start of moving picture recording;
    a switching control section which switches a read or write speed of data in the working memory from a low speed to a high speed when the transition to the stand-by state of moving picture recording is indicated by the transition indicating section;
    a processing control section which starts compression processing by the moving picture compressing section and recording processing by the recording control section when the start of moving picture recording is indicated by the start indicating section;

a display section which displays a through image; and a display control section which displays on the display section the moving picture data obtained by the moving picture photographing processing by the image pickup section as the through image when the read or write speed of data in the working memory is set to the low speed;

wherein the transition indicating section indicates the transition to the stand-by state of moving picture recording while the through image is displayed on the display section by the display control section; and wherein the start indicating section indicates the start of moving picture recording while the stand-by state of moving picture recording is set.

10. The image pickup apparatus according to claim 9, wherein the processing control section further starts moving picture photographing processing by the image pickup section when the start of moving picture recording is indicated by the start indicating section.

11. The image pickup apparatus according to claim 9, wherein the start indicating section indicates the start of moving picture recording in response to a predetermined key operation.

12. The image pickup apparatus according to claim 9, further comprising an end indicating section which indicates an end of moving picture recording, wherein the processing control section ends the compression processing by the moving picture compressing section and the recording processing by the recording control section when the end of moving picture recording is indicated by the end indicating section, and wherein the switching control section switches the read or write speed of data in the working memory from the high speed to the low speed when the end of moving picture recording is indicated by the end indicating section.

13. The image pickup apparatus according to claim 12, wherein the end indicating section indicates the end of moving picture recording in response to a predetermined key operation.

14. The image pickup apparatus according to claim 12, wherein the end indicating section indicates the end of moving picture recording in response to passing of a predetermined time after the start of moving picture recording is indicated by the start indicating section.

15. The image pickup apparatus according to claim 9, wherein the transition indicating section indicates the transition to the stand-by state of moving picture recording in response to a predetermined key operation.

16. The image pickup apparatus according to claim 15, wherein the transition indicating section indicates the transition to the stand-by state of moving picture recording in response to a setting operation of a moving picture photographing mode.

17. The image pickup apparatus according to claim 15, further comprising a shutter button which is operable at two-stages of a half-pressed state and a fully-pressed state, wherein the transition indicating section indicates the transition to the stand-by state of moving picture recording in response to the half-pressing operation of the shutter button.

18. The image pickup apparatus according to claim 16, wherein the switching control section further switches the read or write speed of data in the working memory from the high speed to the low speed in response to a setting canceling operation of the moving picture photographing mode.

19. The image pickup apparatus according to claim 17, wherein the switching control section further switches the read or write speed of data in the working memory from the high speed to the low speed in response to a cancellation of the half-pressing operation of the shutter button.

20. The image pickup apparatus according to claim 15, wherein the transition indicating section indicates the transition to the stand-by state of moving picture recording in response to a shutter button operation.

21. The image pickup apparatus according to claim 15, wherein the start indicating section indicates the start of moving picture recording in response to a key operation which is the same as the predetermined key operation.

22. The image pickup apparatus according to claim 15, wherein the switching control section further switches the read or write speed of data in the working memory from the high speed to the low speed in response to passing of a predetermined time after the predetermined key operation.

23. The image pickup apparatus according to claim 9, wherein the moving picture compressing section compresses the moving picture data by compression processing including inter-frame predictive coding.

24. The image pickup apparatus according to claim 23, wherein the moving picture compressing section compresses the moving picture data by compression processing in accordance with an MPEG system.

25. An image pickup apparatus comprising:

image pickup means for photographing a moving picture;

moving picture compressing means for compressing moving picture data obtained by moving picture photographing processing by the image pickup means using a working memory;

recording control means for recording the moving picture data compressed by the moving picture compressing means onto a recording medium;

start indicating means for indicating a start of moving picture recording;

processing control means for starting compression processing by the moving picture compressing means and recording processing by the recording control means when the start of moving picture recording is indicated by the start indicating means;

switching control means for switching a read or write speed of data in the working memory from a low speed to a high speed when the start of moving picture recording is indicated by the start indicating means;

display means for displaying a through image; and display control means for displaying on the display means the moving picture data obtained by the moving picture photographing processing by the image pickup means as the through image when the read or write speed of data in the working memory is set to the low speed;

wherein the start indicating means indicates the start of moving picture recording while the through image is displayed on the display means by the display control means.

26. An image pickup apparatus comprising:

image pickup means for carrying out moving picture photographing;

moving picture compressing means for compressing moving picture data obtained by moving picture photographing processing by the image pickup means using a working memory;

recording control means for recording the moving picture data compressed by the moving picture compressing means onto a recording medium;

transition indicating means for indicating a transition to a stand-by state of moving picture recording;
start indicating means for indicating a start of moving picture recording;
switching control means for switching a read or write speed of data in the working memory from a low speed to a high speed when the transition to the stand-by state of moving picture recording is indicated by the transition indicating means;
processing control means for starting compression processing by the moving picture compressing means and recording processing by the recording control means when the start of moving picture recording is indicated by the start indicating means;
display means for displaying a through image; and
display control means for displaying on the display means the moving picture data obtained by the moving picture photographing processing by the image pickup means as the through image when the read or write speed of data in the working memory is set to the low speed;
wherein the transition indicating means indicates the transition to the stand-by state of moving picture recording while the through image is displayed on the display means by the display control means; and
wherein the start indicating means indicates the start of moving picture recording while the stand-by state of moving picture recording is set.

27. A moving picture photographing method of an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, the moving picture photographing method comprising:
    indicating a start of moving picture recording;
    switching a read or write speed of data in the working memory from a low speed to a high speed when the start of moving picture recording is indicated;
    starting compression processing by the moving picture compressing section and recording processing by the recording control section after the read or write speed of data in the working memory is switched from the low speed to the high speed;
    displaying a through image; and
    displaying the moving picture data obtained by the moving picture photographing processing as the through image when the read or write speed of data in the working memory is set to the low speed;
    wherein the start of moving picture recording is indicated while the through image is displayed.

28. A moving picture photographing method of an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, the moving picture photographing method comprising:
    indicating a transition to a stand-by state of moving picture recording;
    switching a read or write speed of data in the working memory from a low speed to a high speed when the transition to the stand-by state of moving picture recording is indicated;
    indicating a start of moving picture recording;
    starting compression processing by the moving picture compressing section and recording processing by the recording control section when the start of moving picture recording is indicated;
    displaying a through image; and
    displaying the moving picture data obtained by the moving picture photographing processing by the image pickup section as the through image when the read or write speed of data in the working memory is set to the low speed;
    wherein the transition to the stand-by state of moving picture recording is indicated while the through image is displayed; and
    wherein the start of moving picture recording is indicated while the stand-by state of moving picture recording is set.

29. A computer readable medium having stored thereon a moving picture photographing program executable by a computer which is provided in an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, wherein the computer executes the program to cause the image pickup apparatus to perform functions comprising:
    indicating a start of moving picture recording;
    switching a read or write speed of data in the working memory from a low speed to a high speed when the start of moving picture recording is indicated;
    starting compression processing by the moving picture compressing section and recording processing by the recording control section after the read or write speed of data in the working memory is switched from the low speed to the high speed;
    displaying a through image; and
    displaying the moving picture data obtained by the moving picture photographing processing as the through image when the read or write speed of data in the working memory is set to the low speed;
    wherein the start of moving picture recording is indicated while the through image is displayed.

30. A computer readable medium having stored thereon a moving picture photographing program executable by a computer which is provided in an image pickup apparatus comprising an image pickup section which can carry out moving picture photographing, a moving picture compressing section which compresses moving picture data obtained by moving picture photographing processing by the image pickup section using a working memory, and a recording control section which records the moving picture data compressed by the moving picture compressing section onto a recording medium, wherein the computer executes the program to cause the image pickup apparatus to perform functions comprising:
    indicating a transition to a stand-by state of moving picture recording;
    switching a read or write speed of data in the working memory from a low speed to a high speed when the transition to the stand-by state of moving picture recording is indicated;

indicating a start of moving picture recording;
starting compression processing by the moving picture compressing section and recording processing by the recording control section when the start of moving picture recording is indicated;
displaying a through image; and
displaying the moving picture data obtained by the moving picture photographing processing by the image pickup section as the through image when the read or write speed of data in the working memory is set to the low speed;
wherein the transition to the stand-by state of moving picture recording is indicated while the through image is displayed; and
wherein the start of moving picture recording is indicated while the stand-by state of moving picture recording is set.

* * * * *